(12) United States Patent
Moore et al.

(10) Patent No.: US 10,722,789 B2
(45) Date of Patent: Jul. 28, 2020

(54) INTEGRATED GAME DEVELOPMENT CLOUD COMPUTING PLATFORM

(71) Applicant: Microsoft Technology Licensing, LLC, Redmond, WA (US)

(72) Inventors: George M. Moore, Bellevue, WA (US); John Peter Bruno, Jr., Snoqualmie, WA (US); Donald McNamara, Woodinville, WA (US); Ashok Chandrasekaran, Redmond, WA (US); David R. Reed, Seattle, WA (US); Chad Curtis Gibson, Seattle, WA (US)

(*) Notice: Subject to any disclaimer, the term of this patent is extended or adjusted under 35 U.S.C. 154(b) by 926 days.

(21) Appl. No.: 14/170,075

(22) Filed: Jan. 31, 2014

(65) Prior Publication Data

US 2015/0057078 A1   Feb. 26, 2015

Related U.S. Application Data

(60) Provisional application No. 61/868,048, filed on Aug. 20, 2013.

(51) Int. Cl.
| | |
|---|---|
| *A63F 13/35* | (2014.01) |
| *A63F 13/60* | (2014.01) |
| *G06F 8/71* | (2018.01) |

(52) U.S. Cl.
CPC .............. *A63F 13/35* (2014.09); *A63F 13/60* (2014.09); *G06F 8/71* (2013.01)

(58) Field of Classification Search
CPC ............. A63F 13/35; A63F 13/60; G06F 8/71
(Continued)

(56) References Cited

U.S. PATENT DOCUMENTS

| | | | | |
|---|---|---|---|---|
| 2007/0050452 A1* | 3/2007 | Raju | ................... | H04L 12/1813 709/204 |
| 2007/0259709 A1* | 11/2007 | Kelly | ................... | G07F 17/3267 463/20 |

(Continued)

OTHER PUBLICATIONS

Curran et al, "The Future of Web and Mobile Game Development", International Journal of Cloud Computing and Services Science (IJ-CLOSER), vol. 1, No. 1, Mar. 2012, pp. 25~34.*

(Continued)

*Primary Examiner* — Geoffrey R St Leger
*Assistant Examiner* — Zengpu Wei
(74) *Attorney, Agent, or Firm* — Ray Quinney & Nebeker; Thomas M. Hardman; Sunah K. Lee

(57) ABSTRACT

In various embodiments, methods and systems for game development based on an integrated game development cloud computing platform are provided. Development components that facilitate game development using an integrated game-cloud component are initiated. An input is received to perform a game development task. The game development task is associated with one or more games. The game development task is executed using the integrated game-cloud component. The integrated game-cloud component comprises a game-development-platform development component and a cloud-computing-platform development component combined into an integrated development component supported on the integrated game development cloud computing platform. The game development task can be associated with a first game-platform and a second game-platform of a selected game. The game-platform functions with a cross-platform support component having an integrated core module and an integrated game-platform module.

20 Claims, 11 Drawing Sheets

(58) Field of Classification Search
USPC .......................................................... 717/120
See application file for complete search history.

(56) References Cited

U.S. PATENT DOCUMENTS

| | | | | |
|---|---|---|---|---|
| 2010/0144443 | A1* | 6/2010 | Graham | A63F 13/60 463/42 |
| 2012/0144307 | A1* | 6/2012 | Tan | G06F 3/038 715/735 |
| 2012/0169646 | A1* | 7/2012 | Berkes | G06F 3/0488 345/174 |
| 2012/0184373 | A1 | 7/2012 | Kim et al. | |
| 2012/0190446 | A1* | 7/2012 | Rogers | G06Q 10/00 463/31 |
| 2012/0271660 | A1 | 10/2012 | Harris et al. | |
| 2012/0283017 | A1 | 11/2012 | Ahiska et al. | |
| 2013/0274000 | A1* | 10/2013 | Novotny | A63F 13/12 463/25 |
| 2013/0274021 | A1* | 10/2013 | Novotny | A63F 13/12 463/42 |
| 2014/0082612 | A1* | 3/2014 | Breitgand | G06F 9/45533 718/1 |
| 2014/0087355 | A1* | 3/2014 | Henry | G09B 7/00 434/362 |
| 2014/0094312 | A1* | 4/2014 | Wouhaybi | A63F 3/00643 463/42 |
| 2014/0157246 | A1* | 6/2014 | Tomlinson | G06F 8/47 717/140 |
| 2014/0179426 | A1* | 6/2014 | Perry | A63F 13/10 463/31 |
| 2014/0274408 | A1* | 9/2014 | Dave | A63F 13/12 463/42 |
| 2014/0325070 | A1* | 10/2014 | Philip | H04L 47/70 709/226 |
| 2014/0357344 | A1* | 12/2014 | Grier | G07F 17/32 463/25 |
| 2016/0085385 | A1* | 3/2016 | Gao | G06Q 10/109 715/814 |

OTHER PUBLICATIONS

Calife et al, "Robot Arena: An augmented reality platform for game development", [Online], 2009, pp. 11:1-11:26, [Retrieved from internet on Feb. 28, 2020], <https://dl.acm.org/doi/abs/10.1145/1486508.1486519> (Year: 2009).*

Tu et al, "Building a Learning Games Network in Cloud Learning Platform based on Immigrant Education", [Online], 2011, pp. 746-750, [Retrieved from internet on Feb. 28, 2020], <https://ieeexplore.ieee.org/stamp/stamp.jsp?tp=&arnumber=5992669> (Year: 2011).*

Wu et al, "Design and Implementation of the Game Engine based on Android Platform", [Online], 2011, pp. 1-4, [Retrieved from internet on Feb. 28, 2020], <https://ieeexplore.ieee.org/stamp/stamp.jsp?tp=&arnumber=6006234> (Year: 2011).*

"Dedicated Server Gaming Solution", Retrieved on: Jun. 11, 2013, Available at: https://cloud.google.com/resources/articles/dedicated-server-gaming-solution.

"Cloud Services Platform Beta", Retrieved on: Jun. 11, 2013, Available at: http://software.intel.com/cloudservicesplatform/documentation/bring-power-cloud-your-games.

Latif, Lawrence, "Microsoft Says Xbox One Games can Offload Computing to Azure Cloud", Published on: May 28, 2013, Available at: http://www.theinquirer.net/inquirer/news/2270888/microsoft-says-xbox-one-games-can-offload-computing-to-azure-cloud.

Niyato, et al., "Game Theoretic Modeling of Cooperation among Service Providers in Mobile Cloud Computing Environments", In IEEE Wireless Communications and Networking Conference: Services, Applications, and Business, Apr. 1, 2012, 6 pages.

"Scoreloop: Cross Platform Mobile Gaming SDK for Virtual Currency, Social Games and Distribution", Published on: May 12, 2011, Available at: http://www.scoreloop.com/developers/overview/.

U.S. Appl. No. 13/898,383, filed May 20, 2013, Bruno, et al.
U.S. Appl. No. 13/897,876, filed May 20, 2013, Bruno, et al.
U.S. Appl. No. 13/765,024, filed Feb. 12, 2013, Bruno, et al.

* cited by examiner

INTEGRATED GAME DEVELOPMENT CLOUD COMPUTING PLATFORM

CROSS-REFERENCE TO RELATED APPLICATIONS

This application claims priority to U.S. Provisional Application Ser. No. 61/868,048, filed Aug. 20, 2013, entitled "INTEGRATED GAME DEVELOPMENT CLOUD COMPUTING PLATFORM," which is incorporated herein by reference in its entirety.

BACKGROUND

Game development publishers develop different types of games for a variety of gaming consoles and systems. Games are developed using game development platforms that can also facilitate the deployment of games. Game development platforms can be accessed through a dedicated game development infrastructure including as a cloud-based service on cloud computing platforms. In particular, cloud-based game services are implemented as separate programming models, Software Development Kits (SDKs), tools, graphical user interfaces, and billing models on cloud computing platforms. In this regard, conventional techniques for providing cloud-based game development platforms are not effective in facilitating an integrated game development cloud computing platform because conventional techniques fail to provide comprehensive support for game development such as game deployment and game management.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention provide a method for game development based on an integrated game development cloud computing platform. Development components that facilitate game development using an integrated game-cloud component are initiated. An input is received to perform a game development task. The game development task is associated with one or more games. The game development task is executed using the integrated game-cloud component. The integrated game-cloud component comprises a game-development-platform development component and a cloud-computing-platform development component combined into an integrated development component supported on the integrated game development cloud computing platform at least in part as a combined set of related functions. The game development task can be associated with a first game-platform and a second game-platform of a selected game. The game-platform functions with a cross-platform support component having an integrated core module and an integrated game-platform module.

BRIEF DESCRIPTION OF THE DRAWINGS

The present invention is described in detail below with reference to the attached drawing figures, wherein.

DETAILED DESCRIPTION

Figure 1:
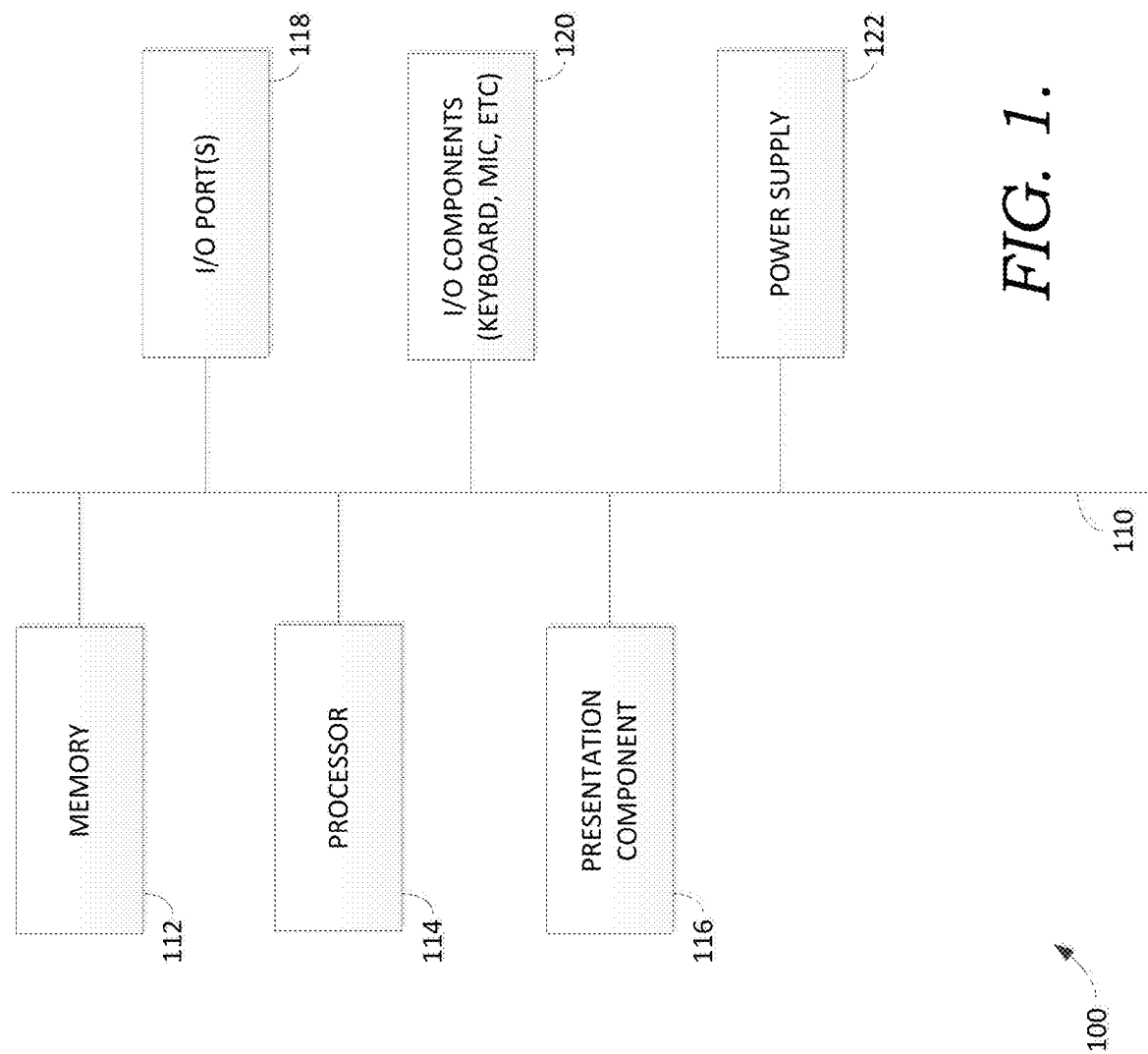
FIG. 1 is a block diagram of an exemplary computing environment suitable for use in implementing embodiments of the present invention.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

For purposes of a detailed discussion below, embodiments of the present invention are described with reference to a game development platform; however the integration of a game development platform is merely exemplary and it is contemplated that the techniques described may be extended to other implementation contexts that integrate other application development platforms into a cloud computing platform.

A game (e.g., video game) developer is a software developer who specializes in game development—the process and related disciplines of creating games. A developer may specialize in a certain game consoles (e.g., MICROSOFT XBOX, NINTENDO WII, SONY PLAYSTATION) or may develop for a number of systems (including client computing devices). A developer may work independently or with a game publisher. A game developer or game publisher (e.g., MICROSOFT, ELECTRONIC ARTS (EA)) each can develop games using game development platforms. A game development platform may generally refer to the hardware architecture and/or software architecture that support computer programming (i.e., writing and maintaining of source code) for game development. A game development platform may be, among other types, a desktop-based, web-based, cloud-based game development platform.

The platform includes hardware architecture and a software framework, where the combination can allow the games to be developed, deployed, and managed. The hardware architecture refers to identification of physical components and interrelationships and the software framework refers to an abstraction in which software providing generic functionality can be selectively changed by additional user-written code. In particular, a software framework (e.g., development components that generally refer to support programs, programming models, SDKs, compilers, code libraries, tool sets, graphical interfaces, and application programming interfaces (APIs)) can bring together different components to enable game development. In this regard, for example, an independent developer may use a desktop-based game development platform and a game publisher may have a dedicated game development platform infrastructure. Game platforms as a service may also be available for the development, hosting, deployment, and management of game services using a distributed system having a cloud computing platform.

Typically, a cloud computing platform acts to store data or run service applications in a distributed manner. A distributed system cloud computing platform may span across wide geographic locations, including countries and continents. The cloud computing platform can be a public cloud that provides different types of services including compute services (e.g., virtual machines, web sites, cloud services, and mobile services), data services (e.g., storage, SQL databases, SQL reporting, tables, backup, and recovery), networking services (e.g., virtual network, traffic manager, data transfer) and application services (e.g., media services, service bus, notification hubs, and multi-factor authentication). For example, the cloud computing platform provides for running service applications and storing data on machines in an internet-accessible datacenter. In particular, a cloud-based game development platform may implement development components for a game for developing, hosting, and deploying games services. In embodiments, cloud-based service may be provided based on service level agreements, i.e., the service-application components (e.g., tenant infrastructure) of a service application maintained based on agreements with the tenant. A tenant may have contractual agreements with a host for one or more service-applications and service level agreements and policies for supporting the tenant infrastructure.

The service-application components (e.g., tenant infrastructure or tenancy) of the cloud computing platform may include nodes (e.g., computing devices, processing units, or blades in a server rack) that are allocated to run one or more portions of a tenant's service applications. When more than one separate service applications are being supported by the nodes, the nodes may be partitioned into virtual machines or physical machines that concurrently run the separate service applications, respectively, in individualized computing environments that support the resources and/or operating system specific to each service application. Further, each service application may be divided into functional portions such that each functional portion is able to run on a separate virtual machine. Generally, "roles" provide a template description of the functional portion of the service application. Roles are described by indicating the computer code implementing the role, the conditions within the hosting environment that are needed by the role, configuration settings to be applied to the role, and the role's set of endpoints for communication with other roles, elements, etc. In one instance, the role's configuration settings may include collective settings, which are shared by all instances of the role, or individual settings that are particular to each instance of the role.

In embodiments, a service model is employed to determine which attributes, or a set of attributes, are to be conveyed from the instances of the roles of the service application. As utilized herein, the phrase "service model" is not meant to be limiting and generally refers to any communication that includes information pertaining to establishing and managing instances of a service application within a datacenter. Generally, the service model is an interface blueprint that provides instructions for managing component programs of the service application. The service model acts to guide a cloud computing platform in coordinating activities between the deployed service applications and service-application components upon deployment to distributed locations throughout the distributed system. The service model includes a description of which roles of the service application are to be established, or how the instances of each of the roles are to be installed and activated within the data center. That is, the service model serves as an articulation of which roles may be running for the service application and conditions for where instances of the roles may be installed through a cloud computing platform. The implementation of a service application for a tenant (e.g., customer or company) may be a model environment or a customized environment configured as a service model of the cloud computing platform that includes one or more roles, typically running multiple instances of each role, using load balancing across the instances of roles.

The cloud computing platform components (e.g., a fabric controller) are further responsible for various duties surrounding the monitoring, maintenance, and management of the health of computer resources, network gear, serial devices, and power units that support the underlying functionality of the fabric. Various differing types of cloud configurations may be implemented with embodiments of the present invention, thus it should be understood and appreciated by those of ordinary skill in the art that suitable structures of cloud computing platform may be used, and that embodiments of the present invention are not limited to those described herein.

The conventional techniques for providing game development platforms are not effective or efficient in facilitating an integrated game development cloud computing platform. For example, a game publisher utilizing cloud-based services for lobby rendezvous services, high score services, or even deployment of cloud-based games would utilize a first set of SDKs and control interfaces and the same game publisher would use a second set of SDKs and control interface for compute, data, application, and network services. Conventional techniques also lack support for cross-platform titles which could use the same programming model in supporting different game-platforms. Moreover, a singular business model is unavailable to pay a uniform rate for cloud-based services for different console manufacturers. At a basic level today, a game development platform as a cloud-based implementation is merely another service-application that receives resources and support through a cloud computing platform without integrating the development components of the game development platform with the hosting infrastructure of the cloud computing platform. An integrated game development cloud computing platform provides comprehensive support for game development, including deployment and management, using integrated features and functions (e.g., services) from the game development platform and the cloud computing platform, plus a resulting business model framework by which to pay for cloud services consumed.

Generally, embodiments of the present invention provide simple and efficient integrated game development cloud computing platform system, and methods for developing games using the integrated game development cloud computing platform. In particular, development components that are defined herein to broadly refer to the programming models, SDKs, APIs, tools, libraries, graphical user interfaces, and service and billing models, for an integrated game development cloud computing platform are generated from integrating development components from the development components of game development platforms into the development components of the cloud computing platform. It is contemplated that the existing development components of a public cloud computing platform are extended such that the development components support game-cloud services. In addition, the business model that determines costs may be uniform market-competitive rates for execution and operation of a tenant infrastructure, including compute services, data services, application services, and network services. The integrated game development cloud computing platform may further include a developer portal that provides a graphical user interface (GUI) for a developer to develop, deploy and manage game titles within datacenters of the cloud computing platform. In embodiments, the integrated game development cloud computing platform may provide an integrated authentication and authorization model where a game publisher can utilize existing on-premise identity stores (e.g., MICROSOFT ACTIVE DIRECTORY) to access and control the tenant infrastructure in the cloud computing platform for properly authorized employees of the game company itself. It is contemplated that techniques described herein can be used in integrating other types of applications for software development, as such, the use of "game development" is not meant to be limiting.

Accordingly, in a first aspect of the present invention, a method for game development based on an integrated game development cloud computing platform is provided. The method comprises initiating development components that facilitate game development using an integrated game-cloud component. The method also includes receiving an input to perform a game development task. The game development task is associated with one or more games. The method further includes executing the game development task using the integrated game-cloud component. The integrated game-cloud component comprises a game-development-platform development component and a cloud-computing-platform development component combined into an integrated development component supported on the integrated game development cloud computing platform at least in part as a combined set of related functions.

In a second aspect of the present invention, a system having an integrated application development cloud computing platform is provided. The system includes an interface component configured for: initiating development components that facilitate application development; and receiving an input to perform an application development task. The application development task is associated with one or more applications. The system further includes an integrated application-cloud component configured for: executing the application development task, the integrated application-cloud component comprises an application-development-platform development component and a cloud-computing platform development component combined into an integrated development component supported on the integrated application development cloud computing platform at least in part as a combined set of related functions. The system also includes a monitoring component configured for: monitoring one or more application-cloud integrated services. At least one of the one or more application-cloud integrated services is configured for monitoring based on an integrated application-cloud package. The system further includes a business component configured for: calculating an integrated application-cloud usage charge. The integrated application-cloud usage charge comprises a combined charge for usage of the one or more application-cloud services.

In a third aspect of the present invention, one or more computer-readable media storing computer-useable instructions that, when used by one or more computing devices, cause the one or more computing devices to perform a method for game development based on an integrated game development cloud computing platform is provided. The method includes initiating development components that facilitate game development of two or more games using an integrated game-cloud component. A game from the two or more games is configured for two or more game-platforms. The method further includes receiving an input to perform a game development task; the game development task is associated with a first game-platform or a second game-platform for the game. The first game-platform and the second game-platform are associated with a cross-platform support component having an integrated core module and an integrated game-platform module. The method also includes executing the game development tasking using the integrated game-cloud component. The integrated game-cloud component includes a game-development-platform development component and a cloud-computing-platform development component combined into an integrated development component that functions with the integrated core module and an integrated game-platform module.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
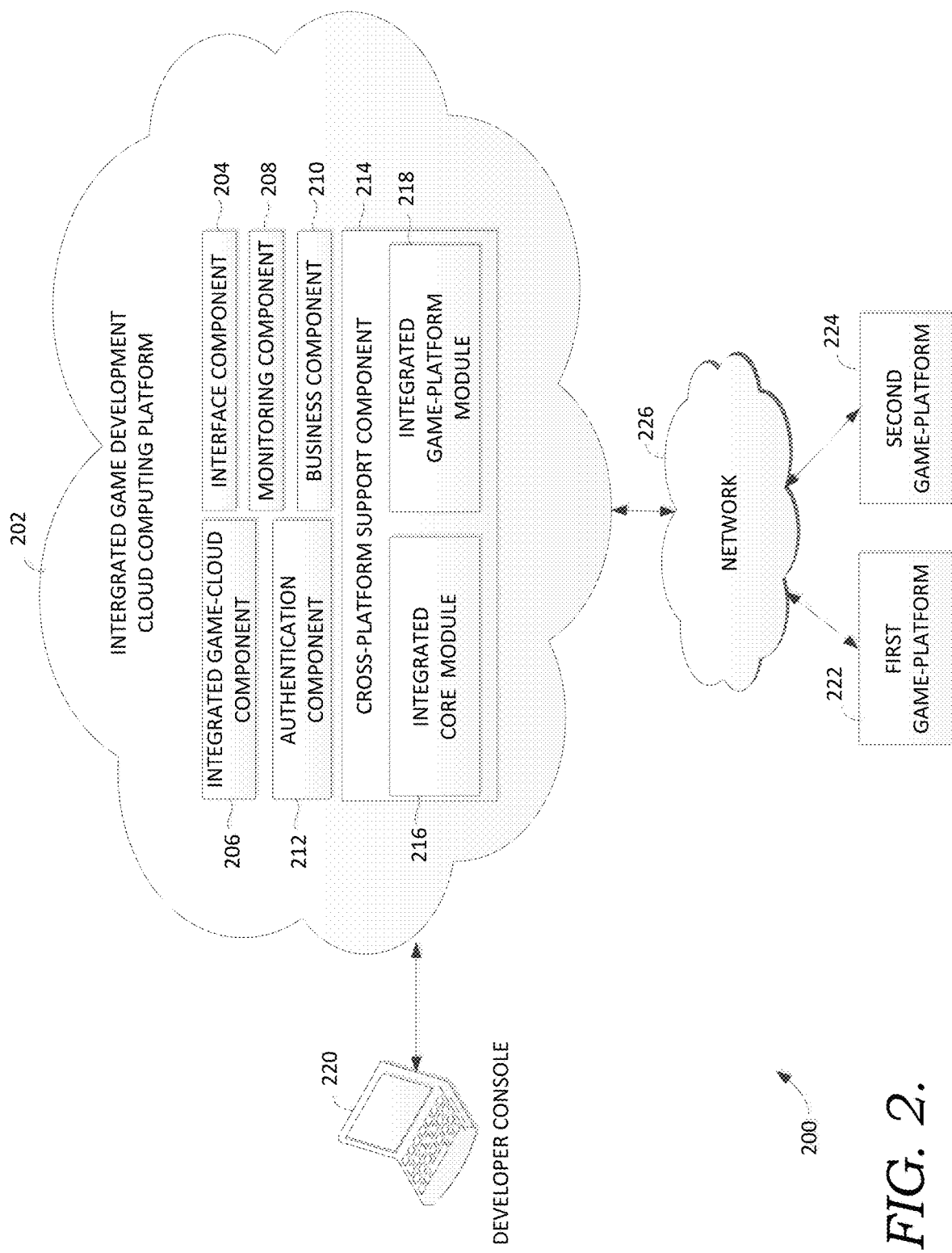
FIG. 2 is a block diagram of an exemplary integrated game development cloud computing platform in which embodiments of the invention may be employed.
Figure 3:
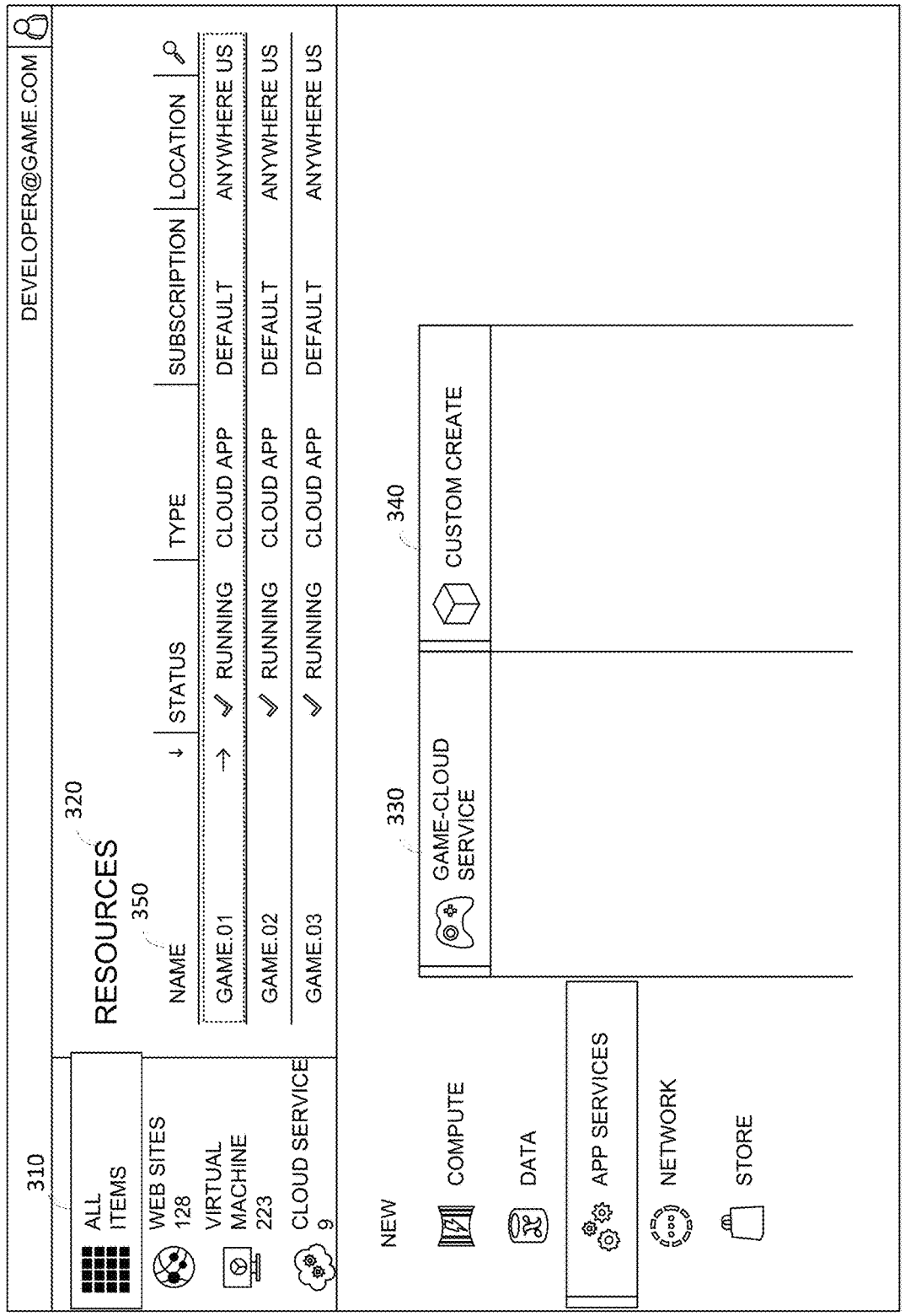
FIG. 3 is a schematic diagram showing a graphical user interface for game development based on an integrated game development cloud computing platform, in accordance with embodiments of the present invention.

With additional reference to FIG. 2, a block diagram depicting an exemplary cloud computing distributed system 200 suitable for use in embodiments of the invention is described. Generally, the cloud computing distributed system 200 illustrates an environment for game development based on an integrated game development cloud computing platform. Embodiments of the present invention also provide a system having an integrated game development cloud computing platform that provides comprehensive support for game development, including deployment and management, using an integrated development component having functions and features from both a game development platform and a cloud computing platform. Among other components not shown, the cloud computing distributed system 200 generally includes an integrated game development cloud computing platform 202 that includes an interface component 204, an integrated game-cloud component 206, a monitoring component 208, a business component 210, an authentication component 212, a cross-platform support component 214 having an integrated core module 216 and an integrated game-platform module 218, a developer console 220, a first game platform 222, a second game platform 224, and a network 226. The network 226 may include, without limitation, one or more local area networks (LANs) and/or wide area networks (WANs). Such networking environments are commonplace in offices, enterprise-wide computer networks, intranets and the Internet. Accordingly, the network 226 is not further described herein. The developer console 220 may include any type of computing device, such as the computing device 100 described with reference to FIG. 1, for example. By way of example only, developer console may be a desktop personal computer, a laptop computer, a cellular telephone, a PDA, or any other client computing device. The developer console 220 can provide access to a developer portal for communicating with the integrated game development cloud computing platform 202. It should be noted, however, that the systems and method described herein are not limited to implementation on the exemplary developer console, but may be implemented on any of a variety of different types of developer consoles within the scope of hereof.

In some embodiments, one or more of the illustrated components/modules may be implemented as stand-alone applications. Any number of developer consoles, integrated game development cloud computing platforms, and games, may be employed in the computing system 200 within the scope of embodiments of the present invention. Each may comprise a single device/interface or multiple devices/interfaces cooperating in a distributed environment. For instance, the integrated game development cloud computing platform 202 may comprise multiple devices and/or modules arranged in a distributed environment that collectively provide the functionality of the integrated game development cloud computing platform 202 described herein.

As used herein, the phrase "game development" is not meant to be limiting, but may encompass a number of different types of applications that can be integrated into a cloud computing platform. Additionally, other components/modules not shown also may be included within the integrated game development cloud computing platform 202. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted all together. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

With reference to FIG. 2, the integrated game development cloud computing platform 202 (hereinafter "integrated platform") is responsible for providing comprehensive functions of both a game development platform and a cloud computing platform in an integrated manner to game developers. The integrated platform 202 can be a public cloud. The integrated platform supports game management tasks that facilitate the development, deployment and managements of game-cloud services. Game management generally refers to tasks performed in delivery game functionality. For example, a game management task can include game development i.e., authoring, modifying, compiling, deploying, debugging, monitoring games and billing for consumed cloud services. Further, game management tasks can also include integrated platform 202 initiating development components for cloud computing platform services e.g., allocating virtual machines within a datacenter for use by a game-cloud service. The integrated game development cloud computing platform 202 may include a data center configured to host and support operation of endpoints a particular game-cloud service. The phrase "application" or "service" as used herein broadly refers to any software, or portions of software, that runs on top of, or accesses storage locations within, the datacenter. In one embodiment, one or more of the endpoints may represent the portions of software, component programs, or instances of roles that participate in the service application. In this regard, the integrated platform 202 provides the infrastructure for executing integrated features and functions of game development and cloud computing.

The interface component 204 in the integrated platform 202 is responsible for generating interfaces for performing game management tasks that combine game development and cloud computing services. In particular, user interface generally refers to the space where human and machine interaction occurs (e.g., graphical user interfaces, voice interfaces, gesture interfaces) to provide effective operation and control of the machine and feedback from the machines. The interfaces may be generated for display on a developer console (e.g., developer console 220) for a developer accessing the integrated platform 202 through a developer portal. The interfaces may also be generated for display on a game platform (e.g., first game-platform 222 and second game-platform 224) that is used to access a game-cloud service. GUI elements can represent game-cloud service features that facilitate performing game management tasks. For example, a graphical element can be generated to facilitate creating a new integrated game-cloud service. The integrated game-cloud service can then be created upon selection of a portion of the GUI that in turn calls an integrated game-cloud component (e.g., integrated game-cloud component 206). The interface component can further be responsible for initiating application interface development components that specify how software components should interact with each other. The applications interfaces can be used to ease the work of programming GUI interface components. It is contemplated that the interface component 204 may function in part in generating and initiating development components that include an API library for the integrated game-cloud component; the API library can include specifications for routines, data structures, object classes, and variables from a combination of a game development platform and a cloud computing platform.

The integrated game-cloud component 206 is generally responsible for executing game management tasks. In particular, the integrated game-cloud component 206 includes a game-development-platform development component and a cloud-computing-platform development component combined into an integrated development component supported on the integrated platform 202. At a basic level, a game development platform and a cloud computing platform may each have separate development components; however, the integrated game-cloud component includes these development components providing their utility in a cohesive unit. In this regard, the integrated platform 202 reduces configuration necessary to piece together multiple development utilities and also increases developer productivity in managing games. In this regard, game development service and a cloud computing service may further be simultaneously instantiated instead of separately without adequate consideration for interrelationship between functions and features of the services. For example, a conventional game service may be a matchmaking game service. In multiplayer games, matchmaking is the process of connecting players together for online play sessions. As implemented with embodiments of the present invention, a matchmaking game-cloud service may be a service model that instantiates both the game and cloud service features for matchmaking. It is contemplated the instantiation process can utilize the same development components. The service model may include attributes, or a set of attributes, to be conveyed from the instances of the roles of the service application. The instantiated game-cloud service may further support game-cloud packages that provide for configuring and managing aspects of the game. For example, configurations and parameters for a matchmaking service may be associated with parties (i.e., groups of players who are treated as a single entity), lobbies (i.e., menu screen for setting up game sessions, examine results, change settings), ranking, contacts, etc. In this regard, the game-cloud service may be created with the simultaneous considerations for game configurations and cloud computing infrastructure. In addition, the integrated game cloud component may communicate with the interface component 204 to generate a second GUI interface. The second interface may be configured to receive additional configuration settings for the game management tasks.

With continued reference to FIG. 2, a monitoring component 208 provides for monitoring and managing performance and availability of game-cloud services. The monitoring component 208 is configured to detect performance problems and also diagnose performance problems. The monitoring component 208 may reference service level agreements to maintain performance and availability at an expected level of service. The monitoring component 208 may also define performance baselines based on historical analysis of the integrated platform 202. The monitoring component can quantify features of performance and availability such that the interface component 204 generates a GUI for communicating monitored data. The monitoring component 28 may track bandwidth or computation resources used by a game (e.g., virtual hard drives, network, virtual machines, and volumes of transactions). The monitoring component may also track latency or responsiveness to user actions (e.g., active sessions, wait times and virtual machine spin ups and spin downs). In this regard, the a game developer may through the developer console 220 monitor metrics that are exposed on a GUI dashboard display that exposes dynamic opening and closing of sessions of a game running on the cloud. Any variations and combinations of monitoring capabilities for the integrated platform 202 are contemplated with embodiments of the present invention.

A business component 210 of the integrated platform 202 is generally responsible for handling a charge model for usage of resources in the integrated platform 202. The charge model may be provided uniformly for a plurality of different types of applications (e.g., games, business applications, and web applications). In particular, a tenant having a game supported by different console manufacturers can pay a uniform rate for game-cloud services for different console manufacturers. The charge model may be associated with usage of compute, data, application, and network services. For example, the charge model may charge based on the number of roles and amount of time a game is deployed or for ingress and egress data transfer. Any variations and combinations of usages to charge amounts are contemplated with embodiments of the present invention.

An authentication component 212 of the integrated platform 202 is generally responsible for implementing an authentication and authorization model. The authentication component 212 may utilize an existing on-premise identity store to access and control game-cloud services. In particular, an integrated role-based access control model may be implemented in which only named game company individuals can gain access to specific game resources running in the cloud. Any variations and combinations of identity models are contemplated with embodiments of the present invention.

With continued reference to FIG. 2, a cross-platform support component 214 having an integrated core module 216 and an integrated game-platform module 218. The cross-platform support component 214 works with hardware and software used to run games on different platforms (e.g., a first game platform 222 and a second game platform 224). A cross-platform game may refer to a game release on a range of video game consoles or game-platforms. In this regard, the cross-platform support component 214 specifically functions to accommodate cross-platform games. The cross-platform support component 214 provides a way to cloud compute aspects of a game consistently. For example, a game developer may have a first portion of the game code run unmodified on multiple platforms and a second portion of game code that is specific to a game-platform. As such, the processing of the first portion of game code is computed consistently on the integrated platform 202. Support for this functionality may be based on an integrated core module and an integrated game-platform module. In embodiments the modules function similar to the integrated game-cloud component in that the game-cloud services with the cross-platform functionality are instantiated with integrated development components of the game and cloud. Further, the module may each include a library code i.e., behaviors that can be invoked. A game can invoke a particular library behavior where the library code is organized such that it can be used by multiple games that have no connection to each other. In particular, a plurality of games may utilize the integrated core module 216 for performing functions common to all games; however, platform-specific games may use an integrated game-platform module for performing functions associated with a particular platform. Any variations and combinations of cross-platform functionality as described herein are contemplated with embodiments of the present invention.

With reference to FIGS. 3-9, exemplary illustrations of the GUI of the integrated game development cloud computing platform are shown. The GUI can include graphical representations of the game-cloud services provided through the integrated platform 202. In particular can game-cloud services include compute, data, application, and network services implemented as integrated game-cloud service through the interface. Resources 320 currently in use and associated attributes and configuration may further be displayed. The GUI may include attributes (e.g., name 350) that help identify the particular resource and the associated attributes. From the GUI, selection of particular graphical elements (e.g., game-cloud service 330 and custom create 340) can initiate, using an integrated game-cloud component, the execution of a game management task (e.g., creating a service model game-cloud service or custom created game-cloud service).

Figure 4:
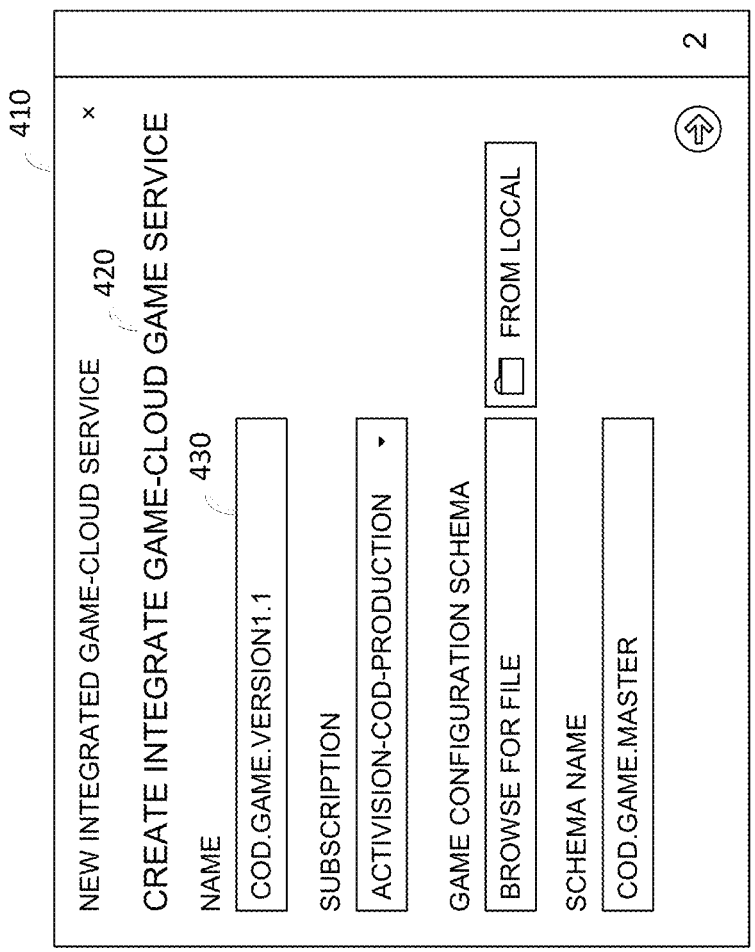
FIG. 4 is a schematic diagram showing a graphical user interface for game development based on an integrated game development cloud computing platform, in accordance with embodiments of the present invention.
Figure 5:
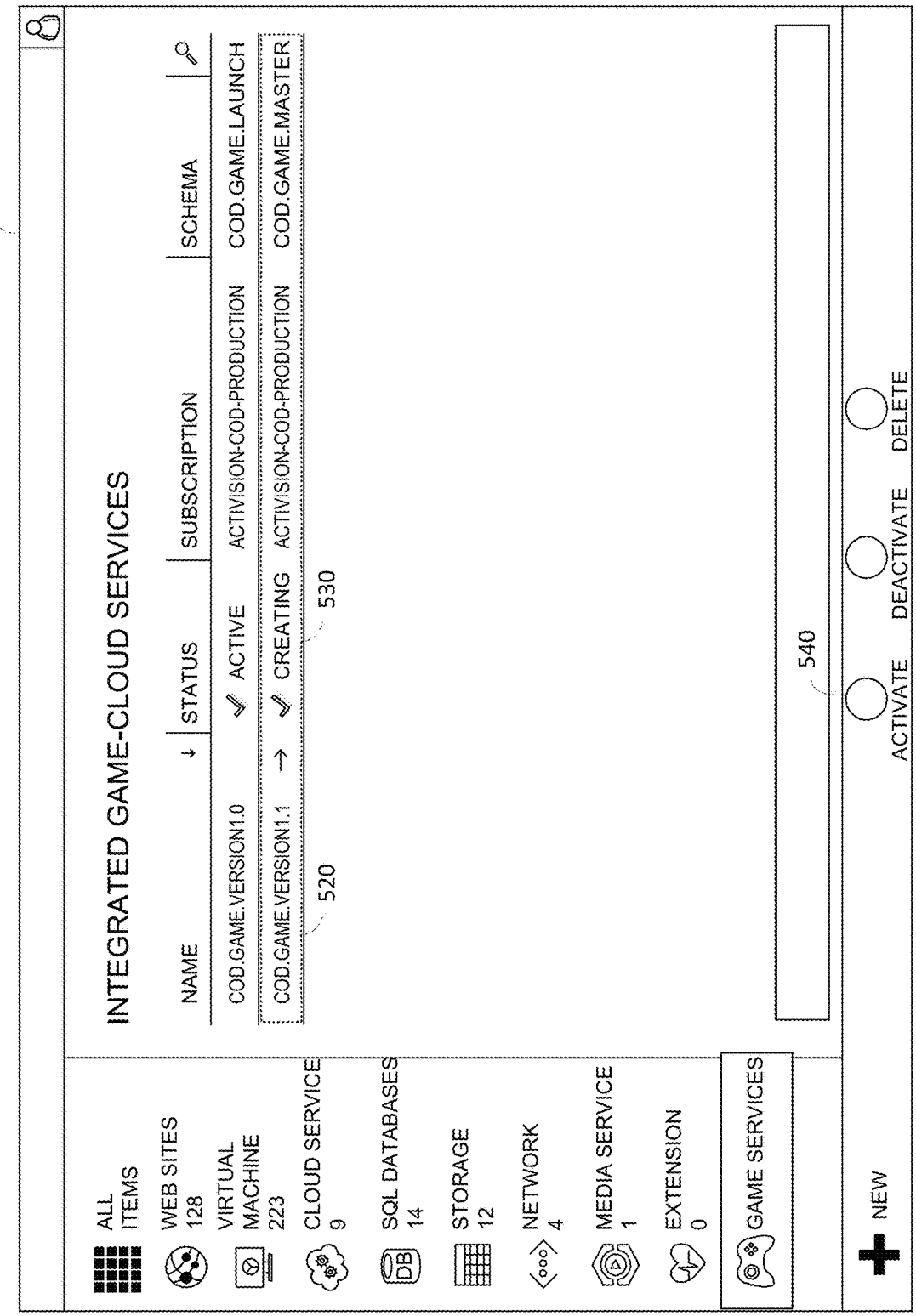
FIG. 5 is a schematic diagram showing a graphical user interface for game development based on an integrated game development cloud computing platform, in accordance with embodiments of the present invention.

With reference to FIG. 4, a new integrated game-cloud service GUI 410 may be generated based on the selection of a graphical element to create a new game-cloud service. The a new integrated game-cloud service GUI 410 may facilitate executing the game management task 420 based on configuration attributes entered in available fields (e.g., name 430). Upon completing configuration attributes an integrated game-cloud service GUI 510 may be generated. The integrated game-cloud service GUI 510 may display a plurality of game-cloud services including game 520 and an associated status of the game-cloud service 530. The integrated game-cloud service GUI 510 may further include additional game management tasks 540 that can be performed on the game-cloud services displayed.

Figure 6:
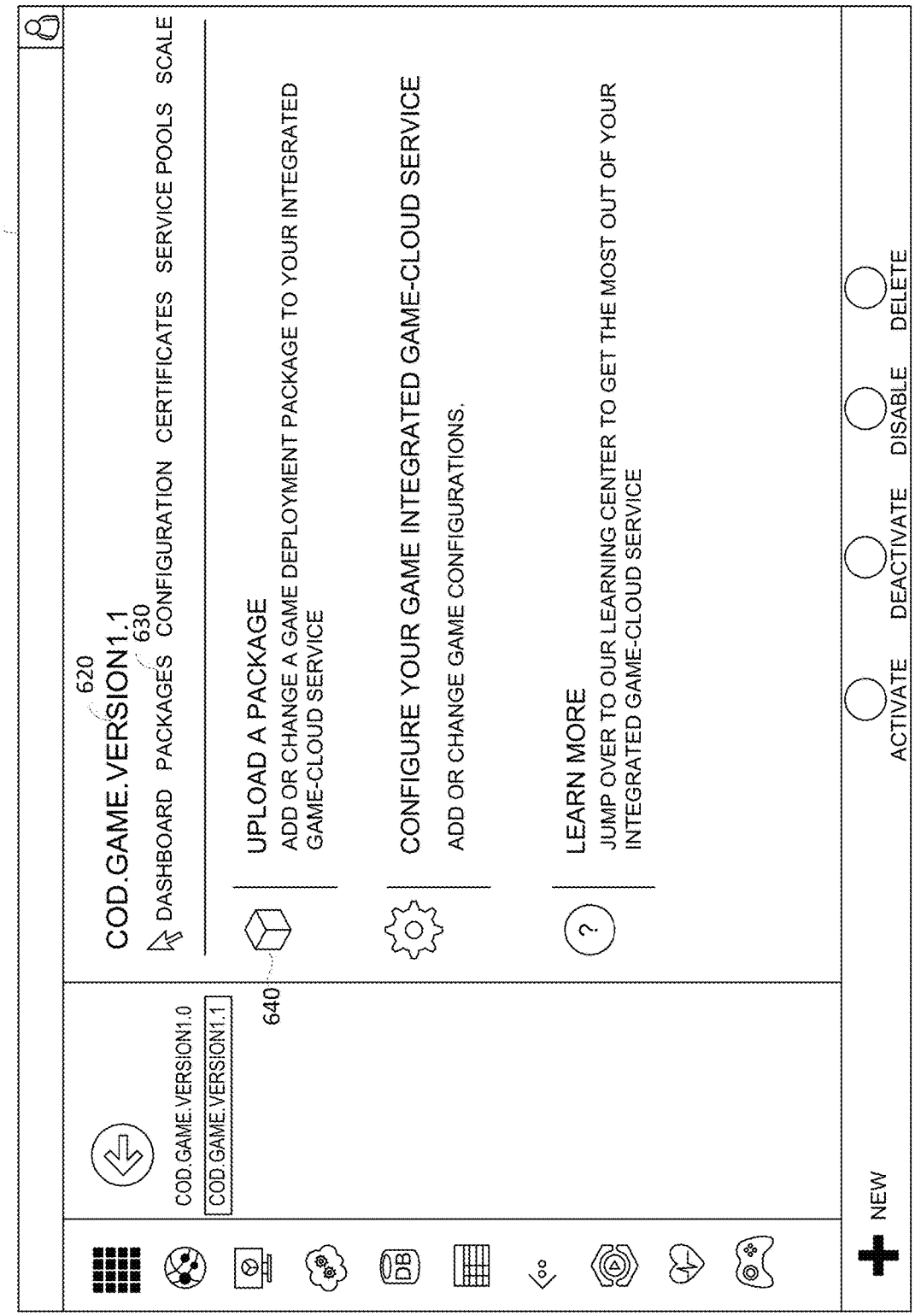
FIG. 6 is a schematic diagram showing a graphical user interface for game development based on an integrated game development cloud computing platform, in accordance with embodiments of the present invention.
Figure 7:
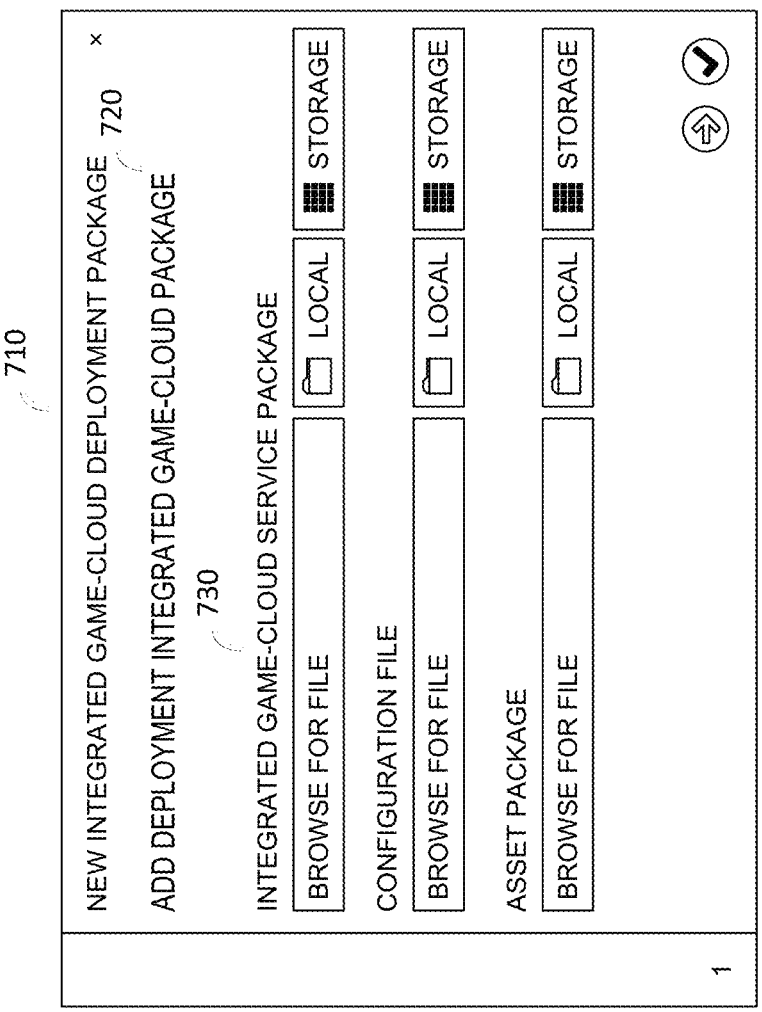
FIG. 7 is a schematic diagram showing a graphical user interface for game development based on an integrated game development cloud computing platform, in accordance with embodiments of the present invention.
Figure 8:
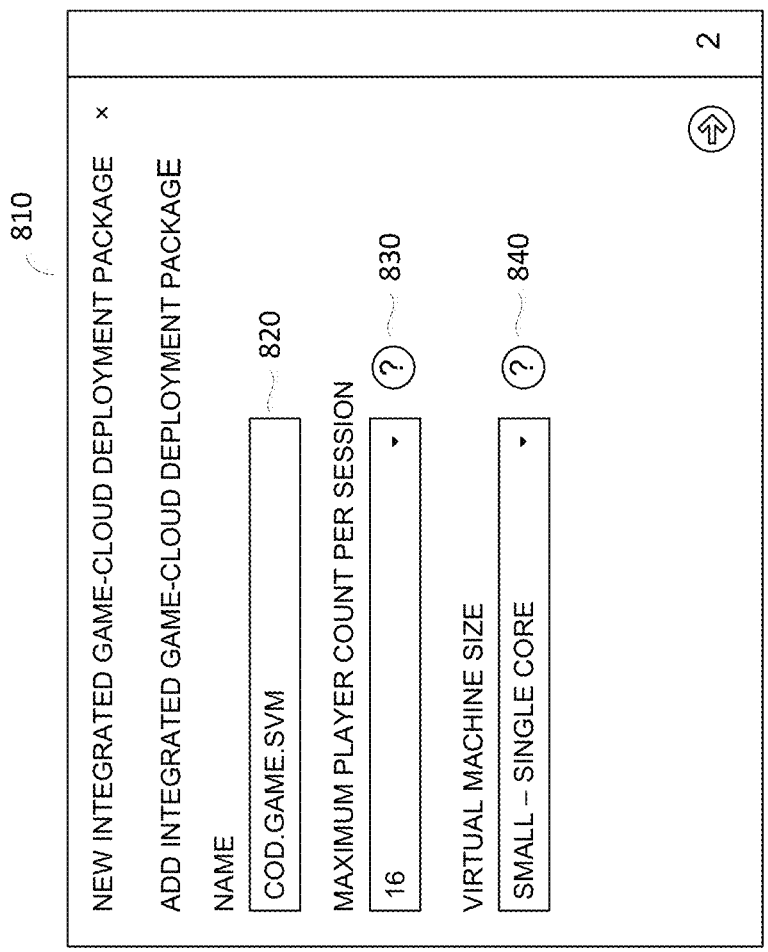
FIG. 8 is a schematic diagram showing a graphical user interface for game development based on an integrated game development cloud computing platform, in accordance with embodiments of the present invention.

FIG. 6 illustrates a game GUI 610 that provides for performing game management tasks associated with the game 620. Additional graphical elements may be generated that are associated with specific attributes of the game. For example, selecting packages 630 can navigate to an interface having the packages associated with the game 620. In addition, the interface includes graphical elements for several more game management tasks, including upload a package 640 that allows a developer to add or change a game deployment package to the game-cloud service. FIG. 7 includes a new integrated game-cloud deployment package GUI 710 that may be generated based on the selection of a graphical element to upload a package. The new integrated game-cloud deployment package GUI 710 can facilitate executing the game management task 720 based on configuration attributes selected from available fields (e.g., integrated game-cloud service package 730). FIG. 8 includes the new integrated game-cloud deployment package GUI 810 that can further provide additional fields for configuration of attributes of the deployment package. For example, name 820, maximum number of players count per session 830, and virtual machine size 840.

Figure 9:
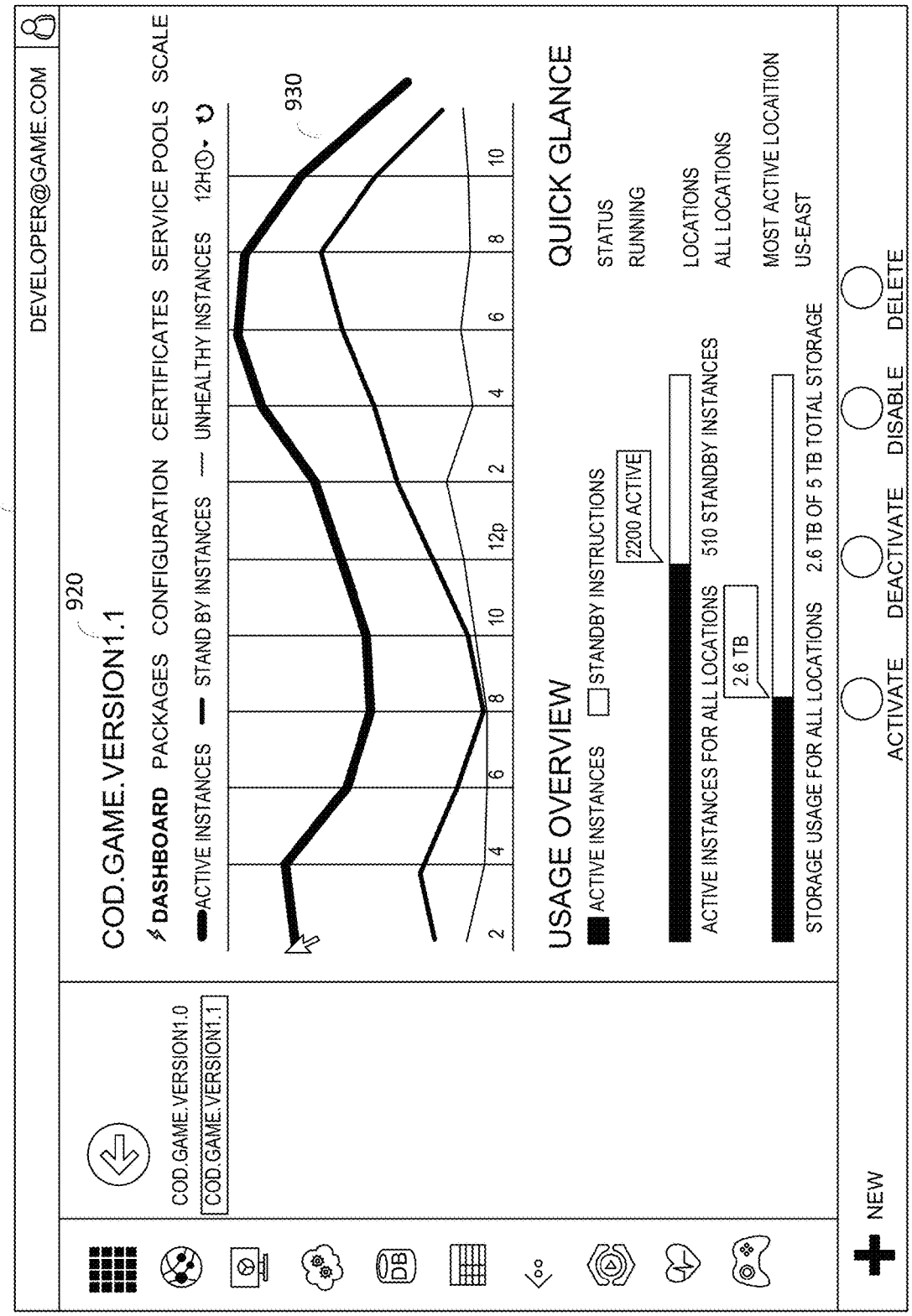
FIG. 9 is a schematic diagram showing a graphical user interface for game development based on an integrated game development cloud computing platform, in accordance with embodiments of the present invention.

With reference to FIG. 9, an exemplary monitoring dashboard GUI 910 is displayed. For a selected game 920, the monitoring dashboard GUI 910 graphically represents monitoring and managing performance and availability of game-cloud services. Although not shown, the monitoring dashboard GUI 910 may further include graphical elements that detect performance problems and also diagnose performance problems. The monitoring dashboard GUI 910 includes tracking graphical elements 930 for tracking bandwidth or computation resources used by a game (e.g., virtual hard drives, network, virtual machines, and volumes of transactions) and latency or responsiveness to user actions (e.g., active sessions, wait times and virtual machine spin ups and spin downs). In this regard, the a game developer may through a developer console monitor metrics that are exposed on the monitoring dashboard GUI 910, for example, dynamic opening and closing of sessions of a game running on the cloud.

Figure 10:
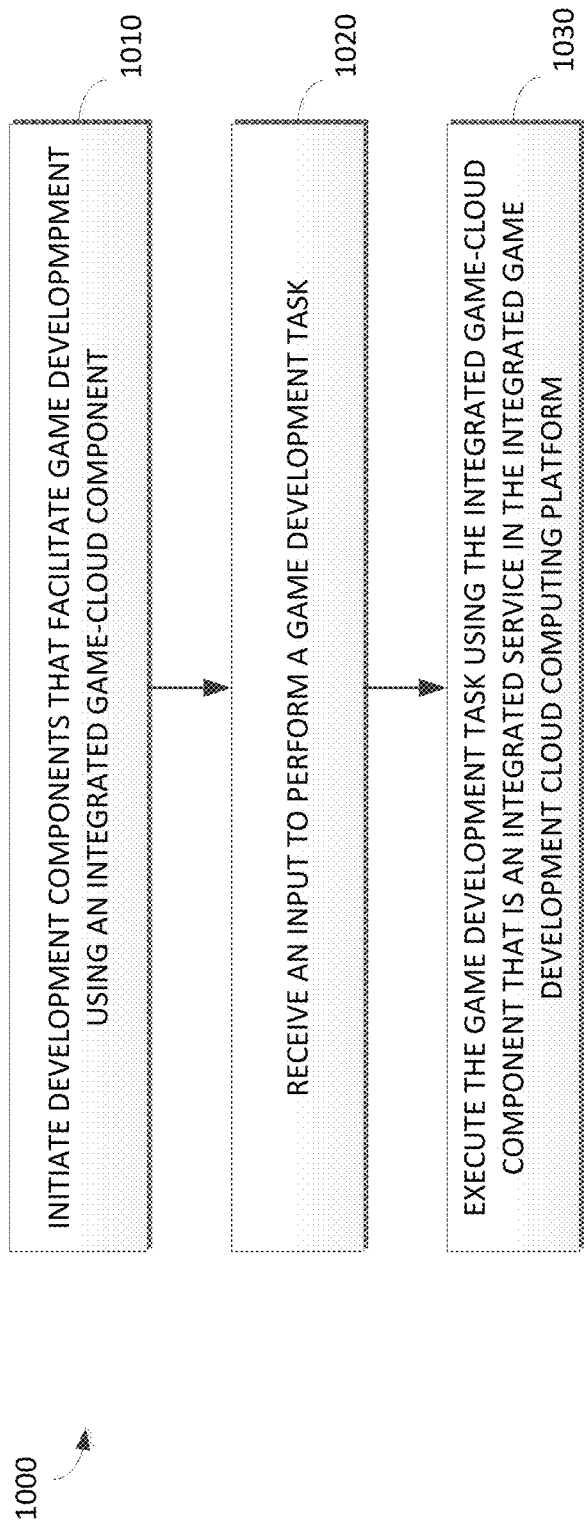
FIG. 10 is a flow diagram showing a method for game development based on an integrated game development cloud computing platform, in accordance with embodiments of the present invention.

Turning now to FIG. 10, a flow diagram is provided that illustrates a method 1000 for game development based on an integrated game development computing platform. At block 1010, development components that facilitate game development using an integrated game-cloud component are initiated. The development components can include a graphical user interface (GUI) having graphical elements representing game-cloud service features such that selecting the graphical elements initiates at least a portion of the integrated game-cloud component to execute the game development task of a selected graphical element. It is contemplated that a second set of development components can also be initiated such that a second GUI is generated, based on a selection, where the second GUI is configured for receiving one or more configuration settings for the game development task.

At block 1020, an input to perform a game development task is received. The game development task is associated with one or more games. The input may include information for both the game development platform service and the cloud computing platform service for configuring a game-cloud service. At block 1030, the game development task is executed using the integrated game-cloud component. The integrated game-cloud component comprises a game development service and a cloud-computing-platform development component combined into an integrated development component supported on the integrated game development cloud computing platform. It is contemplated that executing the game development task using the integrated game-cloud component further includes identifying an integrated game-cloud module of the integrated game-cloud component, the integrated game-cloud module provides a combined set of related functions of the game-development-platform development component and the cloud-computing-platform development component associated with the game development task. At least a portion of the combined set of related function is implemented. One or more game-cloud service features of the integrated game development cloud computing platform are instantiated. In embodiments, the features, associated with the game and the cloud, are simultaneously instantiated as part of executing the game management task with the integrated game-cloud service.

Instantiating the one or more game-cloud service features may further include identifying resources for a game platform service and a cloud computing platform service using the same integrated game-cloud module. For example, game-development-platform development component features include parameters of lobby rendezvous service, high score services, and matchmaking services and cloud computing platform services include parameters of compute services, data services, application services, and network services. It is contemplated that the parameters of the services are deployable using a deployment package that may include code and libraries for implementing the service.

Figure 11:
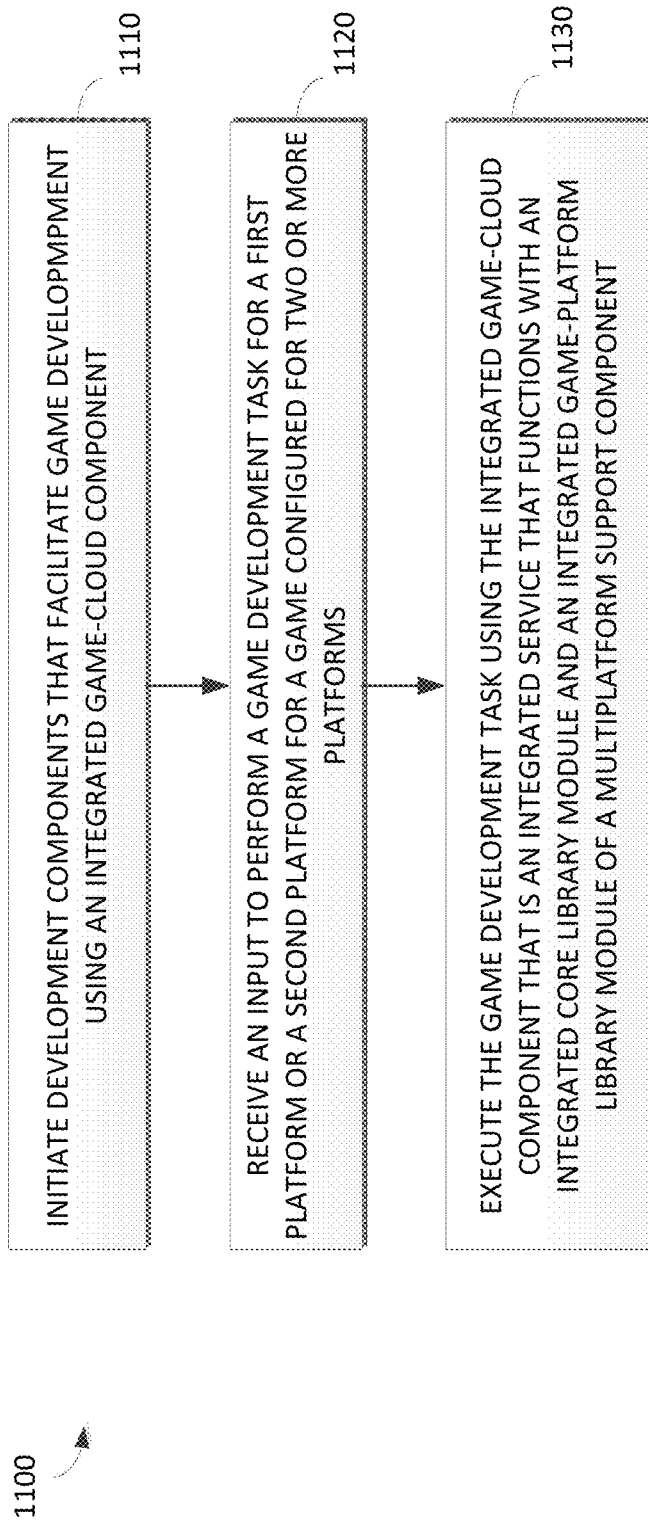
FIG. 11 is a flow diagram showing a method for game development based on an integrated game development cloud computing platform, in accordance with embodiments of the present invention.

Turning now to FIG. 11, a flow diagram is provided that illustrates a method 1100 for game development based on an integrated game development computing platform. At block 1110, development components that facilitate game development using an integrated game-cloud component are initiated. At block 1120, an input is received to perform a game development task, the game development task is associated with a first game-platform or a second game-platform for the game. The first game-platform and the second game-platform are associated with a cross-platform support component having an integrated core module and an integrated game-platform module. At block 1130, the game development task using the integrated game-cloud component is executed. The integrated game-cloud component comprises a game-development-platform development component and a cloud-computing platform service combined into an integrated development component that operates with the integrated core module and the integrated game-platform module.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A method for game development using a cloud computing platform integrated with a game development platform ("integrated platform"), the method comprising:
   initiating an integrated game-cloud component generated by integrating development components of the game development platform into development components of the cloud computing platform, wherein the integrated game-cloud component comprises an API library, wherein the API library includes specifications for routines, data structures, object classes, and variables from a combination of the game development platform and the cloud computing platform, wherein the integrated game-cloud component is configured to use a combined set of functions from the game development platform and the cloud computing platform to:
      execute game development tasks for a game; and
      configure a tenant infrastructure within the cloud computing platform to facilitate deploying the game within the tenant infrastructure;
   receiving an input to perform one of the game development tasks, the input comprising an instruction to deploy an instance of the game; and executing the game development task using the integrated game-cloud component, wherein executing comprises configuring a first service model to (i) simultaneously instantiate at least one game development service and at least one cloud computing platform service within the tenant infrastructure, and (ii) deploy the instance of the game by installing a corresponding role in the tenant infrastructure.

2. The method of claim 1, wherein the integrated game-cloud component extends existing development components of a public cloud computing platform to support configuring the game development service and the cloud computing platform service from the same interface.

3. The method of claim 1, wherein the input to perform the game development task comprises an instruction to configure a deployment of the game within one or more virtual machines of a configurable size within the tenant infrastructure.

4. The method of claim 1, wherein the input to perform the game development task comprises at least one configuration input for a game-development-platform service and at least one configuration input for a cloud-computing platform service for configuring a game cloud service.

5. The method of claim 1, wherein simultaneously instantiating the at least one game development service and the at least one cloud computing platform service comprises utilizing the same development component.

6. The method of claim 5, wherein the integrated game-cloud component comprises a plurality of integrated game-cloud modules, wherein at least a portion of the plurality of integrated game-cloud modules are generated from development components of an existing cloud computing platform combined with development components of an existing game development platform.

7. The method of claim 5, additionally comprising:
identifying resources for the at least one game development service using an integrated game-cloud module; and
identifying resources for the at least one cloud computing platform service using the integrated game-cloud module.

8. The method of claim 7, wherein the at least one game development service comprises at least one of lobby rendezvous services, high score services, and matchmaking services.

9. The method of claim 7, wherein the at least one cloud computing platform service that is simultaneously instantiated with the at least one game development service comprises at least one of compute services, data services, application services, and network services provided by the tenant infrastructure.

10. A system having a cloud computing platform integrated with an application development platform ("integrated platform"), wherein the system comprises:
one or more hardware processors and memory configured for providing computer program instructions to the one or more hardware processors;
an interface component configured to execute on the one or more hardware processors to:
initiate an integrated application-cloud component generated by integrating development components of the application development platform into development components of the cloud computing platform, wherein the integrated application-cloud component comprises an API library, wherein the API library includes specifications for routines, data structures, object classes, and variables from a combination of a game development platform and the cloud computing platform, wherein the integrated application-cloud component is configured to use a combined set of functions from the application development platform and the cloud computing platform;
receive, via a developer portal configured to receive configuration parameters for an application under development and for a tenant infrastructure within the cloud computing platform, an input to perform an application development task for the application; and
execute the application development task, by using the application-cloud component to create a first service model configured to simultaneously instantiate at least one application development service and at least one cloud computing platform service within the tenant infrastructure.

11. The system of claim 10 further comprising an authentication component configured to execute on the one or more hardware processors to:
implement authentication and authorization services, wherein the authentication and authorization services are based at least in part on existing on premise identity stores; and
manage access and control configurations associated with the integrated platform, wherein the access and control configurations are based on a role-based access control model.

12. The system of claim 10, wherein the integrated platform is an integrated game development cloud computing platform configured to support two or more games, wherein the integrated application-cloud component is an integrated game-cloud component, and wherein the application development task is a game development task, the integrated platform further comprising:
a cross-platform component having an integrated core module and an integrated game-platform module.

13. The system of claim 12, wherein the integrated core module is configured to execute on the one or more hardware processors to:
reference the combined set of functions in connection with a non-platform-specific task;
implement at least a portion of the combined set of functions; and
instantiate one or more game-cloud service features of the non-platform-specific-task.

14. The system of claim 12, wherein the integrated game-platform module is configured to execute on the one or more hardware processors to:
reference the combined set of functions in connection with a platform-specific task;
implement at least a portion of the combined set of functions; and
instantiate one or more game-cloud service features of the platform-specific task.

15. The system of claim 12, wherein the integrated platform further comprises a monitoring component configured to execute on the one or more hardware processors to monitor one or more game-cloud integrated services, using the integrated game-cloud component, by:
tracking computation resources of the two or more games;
tracking responsiveness to user actions of the two or more games; and
providing for display on a graphical user interface (GUI) metrics associated with the computation resources and the responsiveness to user actions.

16. The system of claim 12, wherein the integrated platform further comprises a business component configured to execute on the one or more hardware processors to calculate an integrated application-cloud usage charge based on uniform rates for services from one or more console manufacturers that access at least one game of the two or more games, wherein the integrated application-cloud usage charge comprises a uniform charge for usage of one or more game-cloud integrated services.

17. The system of claim 12, wherein the at least one cloud computing platform service includes at least one of: compute services, data services, application services, and network services provided by the tenant infrastructure.

18. One or more computer-readable media storing computer-useable instructions that, when used by one or more computing devices, cause the one or more computing devices to perform a method for game development using a cloud computing platform integrated with a game development platform ("integrated platform"), the method comprising:

initiating an integrated game-cloud component generated by integrating development components of the game development platform into development components of the cloud computing platform, wherein the integrated game-cloud component comprises an API library, wherein the API library includes specifications for routines, data structures, object classes, and variables from a combination of the game development platform and the cloud computing platform, wherein the integrated game-cloud component is configured to use a combined set of functions from the game development platform and the cloud computing platform to:

execute game development tasks for two or more games wherein a game from the two or more games is configured for two or more game-platforms; and configure a tenant infrastructure within the cloud computing platform to facilitate deploying the two or more games within the tenant infrastructure;

receiving an input to perform one of the game development tasks, wherein the game development task is associated with a first game-platform or a second game-platform for the two or more games, wherein the first game-platform and the second game-platform are associated with a cross-platform support component having an integrated core module and an integrated game-platform module; and executing the game development task using the integrated game-cloud component, wherein executing comprises configuring a first service model to (i) simultaneously instantiate at least one game development service and at least one cloud computing platform service within the tenant infrastructure, and (ii) deploy instances of the two or more games by installing corresponding roles in the tenant infrastructure, wherein the integrated game-cloud component operates with the integrated core module and the integrated game-platform module.

19. The one or more computer-readable media of claim 18, wherein the integrated core module functions with a first portion of code of each of the two or more games that runs unmodified on multiple platforms, and the integrated game-platform module functions with a second portion of code of each of the two or more games that is specific to a game-platform.

20. The one or more computer-readable media of claim 18, wherein simultaneously instantiating the at least one game development service and the at least one cloud computing service comprises utilizing the same development component.

* * * * *